United States Patent
House et al.

(10) Patent No.: US 6,332,168 B1
(45) Date of Patent: *Dec. 18, 2001

(54) METHOD OF, SYSTEM FOR, AND COMPUTER PROGRAM PRODUCT FOR PROVIDING A RUN TIME SUBSYSTEM FOR RUN TIME LIBRARIES

(75) Inventors: Daniel E. House, San Jose; Eric L. Porter, Fremont; Robert M. Smith, Morgan Hill; Michael T. Wheatley, San Jose, all of CA (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/535,497

(22) Filed: Sep. 28, 1995

(51) Int. Cl.[7] ............................. G06F 9/00; G06F 9/24; G06F 9/445
(52) U.S. Cl. ............................................. 709/331; 713/2
(58) Field of Search ................... 395/701, 710, 395/685, 712; 709/300–305, 310–332; 713/1, 2

(56) References Cited

U.S. PATENT DOCUMENTS

| | | | |
|---|---|---|---|
| 5,093,916 | 3/1992 | Karp et al. ........................... | 395/700 |
| 5,136,709 | 8/1992 | Shirakabe et al. ................... | 395/700 |
| 5,175,828 | * 12/1992 | Hall et al. . | |
| 5,247,678 | 9/1993 | Littleton ............................... | 395/700 |
| 5,247,681 | * 9/1993 | Janis et al. ........................... | 395/700 |
| 5,297,285 | 3/1994 | Abrahamsson et al. ............. | 395/700 |
| 5,317,722 | * 5/1994 | Evans ................................... | 395/500 |
| 5,339,430 | * 8/1994 | Lundin et al. ....................... | 395/700 |
| 5,359,721 | 10/1994 | Kempf et al. ........................ | 395/425 |
| 5,375,241 | * 12/1994 | Walsh .................................. | 395/700 |
| 5,381,547 | 1/1995 | Flug et al. ........................... | 395/700 |
| 5,386,525 | * 1/1995 | Noack .................................. | 395/400 |
| 5,459,865 | 10/1995 | Heninger et al. .................... | 395/650 |
| 5,475,840 | 12/1995 | Nelson et al. ....................... | 395/700 |
| 5,499,365 | * 3/1996 | Anderson et al. ................... | 395/600 |
| 5,561,800 | * 10/1996 | Sabatella . | |
| 5,579,509 | * 11/1996 | Furtney et al. ...................... | 395/500 |
| 5,581,769 | * 12/1996 | Wallace et al. ...................... | 709/304 |
| 5,634,114 | * 5/1997 | Shipley ................................ | 395/701 |
| 5,659,751 | 8/1997 | Heninger ............................. | 395/685 |

FOREIGN PATENT DOCUMENTS

| | | |
|---|---|---|
| 0336552A2 | 10/1989 | (EP) . |
| 0620522A2 | 10/1994 | (EP) . |
| 2242293A | 9/1991 | (GB) . |
| WO91/08534 | 6/1991 | (WO) . |
| WO94/23364 | 10/1994 | (WO) . |

OTHER PUBLICATIONS

IBM Technical Disclosure Bulletin, "Safe Installation of Object–oriented class libraries common to multiple software products" v. 37, No. 2B, pp. 407–410; 2/94.*

* cited by examiner

Primary Examiner—Majid Banankhah
Assistant Examiner—P Caldwell
(74) Attorney, Agent, or Firm—Gates & Cooper LLP

(57) ABSTRACT

Method of, system for, and computer program product for providing a central repository for information regarding run time library usage and a run time subsytem for using the run time libraries in accordance with the information contained in the central repository. The run time subsystem loads run time libraries when initialized and when requested to do by requests from application programs in accordance with the information contained in the central repository. The run time subsystem's use of the central repository provides improved application program performance, improved system utilization, and improved migration.

49 Claims, 10 Drawing Sheets

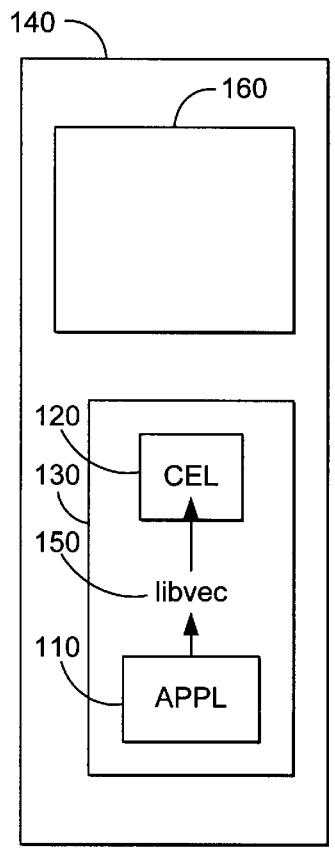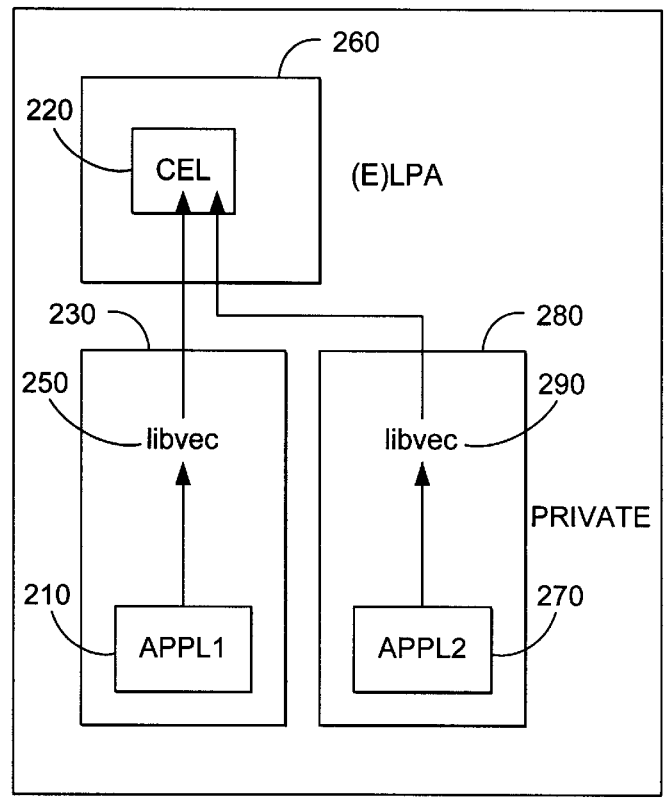
FIG. 1
Prior Art
FIG. 2
Prior Art

METHOD OF, SYSTEM FOR, AND COMPUTER PROGRAM PRODUCT FOR PROVIDING A RUN TIME SUBSYSTEM FOR RUN TIME LIBRARIES

BACKGROUND OF THE INVENTION

1. Field of the Invention

This invention relates to computer program run time libraries, and more particularly to dynamically linking run time libraries to application programs.

2. Description of the Related Art

Traditionally, programming languages do not link-edit all of the support required by an application program into one monolithic load module. Instead, they supply run time libraries which an application program will use at run-time. These Run Time Libraries (RTL) are separately shipped modules which are dynamically linked with application programs when they are run. Finding and associating Run Time Libraries with an application program are done by a language environment. Examples of such a conventional approach are the "IBM LANGUAGE ENVIRONMENT FOR MVS" and the "IBM LE/370" ("IBM" and "LANGUAGE ENVIRONMENT" are registered trademarks and "LE/370" is a trademark of the International Business Machines Corporation).

The method used by conventional systems for finding and associating an application program with its Run Time Libraries may manifest itself in two different scenarios at run time. These two conventional scenarios for finding and using Run Time Libraries are similar, except for the resultant location of the Run Time Libraries in memory. In the first scenario, an application program may be started specifying a Run Time Library to be loaded into the application program's private region of an address space where it may not be shared by other application programs running in the system. In the second scenario, the Run Time Library is pre-installed into a common region of memory where it can be seen and shared by other application programs running in the system.

There are advantages and disadvantages to both of the above scenarios. Common region resident Run Time Libraries result in better performance, because the operating system loads them at system initialization and does not load them from disk afterwards when they are needed by an application program; whereas private region Run Time Libraries are loaded each time they are needed by an application program. However, if two versions of a Run Time Library are needed in the system at the same time, only one version can reside in the common region, and the other version must reside in a private region. A conventional mechanism for specifying that a Run Time Library is to reside in a private region is Job Control Language (JCL), which is a usability problem since there exists separate JCL for every application program. These conventional systems do not provide centralized usage of various Run Time Library versions.

There are performance, usability, and functional deficiencies in these traditional methods. As Run Time Library usage is specified for the operating system and for each application program, this information is widely dispersed throughout the system. Upgrading or migrating to a new version of a Run Time Library requires changes to this widely dispersed information.

Traditional systems do not allow multiple versions of Run Time Libraries to reside in a common region of storage, thus resulting in multiple copies of a Run Time Library residing in multiple private regions of storage. These multiple copies require greater system resources than a single copy, (i.e., more storage, more RTL loads, more RTL initializations, longer application program initializations, and reduced application program private region storage).

Traditional systems do not provide for optional use of common storage or private storage.

In view of the above performance, usability, and functional deficiencies of traditional systems, there is a need for a method of, system for, and computer program product for providing a central repository for information regarding Run Time Library usage.

SUMMARY OF THE INVENTION

The invention disclosed herein comprises a method of, system for, and computer program product for providing a central repository for information regarding Run Time Library usage and a run time subsytem for using the Run Time Libraries in accordance with the information contained in the central repository.

The present invention has the advantage of providing a central repository (Application Profile Data Base) for information regarding Run Time Library usage.

The present invention has the further advantage of allowing multiple versions of Run Time Libraries to have the benefits of common storage. This improves both application program performance (initialization) and system utilization, since only one copy of a Run Time Library need be loaded into memory instead of numerous copies (potentially hundreds).

The present invention has the further advantage of providing improved migration as the central repository allows migration data to be changed in one place, instead of numerous separate application program specific places, such as when using JCL/STEPLIBs.

The present invention has the further advantage of providing an improved framework for future expansion, such as dynamic library maintenance or installation, authorized service access, or usage based library license monitoring.

The present invention has the further advantage of providing improved centralcontrol of migration and application policies.

The present invention has the further advantage of improved performance over conventional systems as the present invention pre-loads any needed modules, pre-builds any needed libvecs, and no loads are done at application program initialization except when specifically requested.

The present invention has the further advantage of improved performance due to exploitation of pre-built library vectors.

The present invention has the further advantage of providing downward compatibility with prior conventional methods (such as JCL/STEPLIB) which may still work as before without affecting older applications programs still using these prior conventional methods.

The present invention has the further advantage of providing optional use of common storage or private storage.

The present invention has the further advantage of providing shared Run Time Libraries while maintaining system isolation between application programs as Run Time Libraries are only loaded into store protected storage areas.

The present invention has the further advantage of providing the ability to separate system usages from application program usages of Run Time Libraries for improved isolation.

BRIEF DESCRIPTION OF THE DRAWINGS

For a more complete understanding of the present invention and the advantages thereof, reference is now made to the Detailed Description in conjunction with the attached Drawings, in which:

FIG. 1 is a block diagram illustrating a first conventional system for finding and associating an application program with its Run Time Libraries at run time;

FIG. 2 is a block diagram illustrating a second conventional system for finding and associating an application program with its Run Time Libraries at run time;

DESCRIPTION OF THE PREFERRED EMBODIMENT

Figure 3:
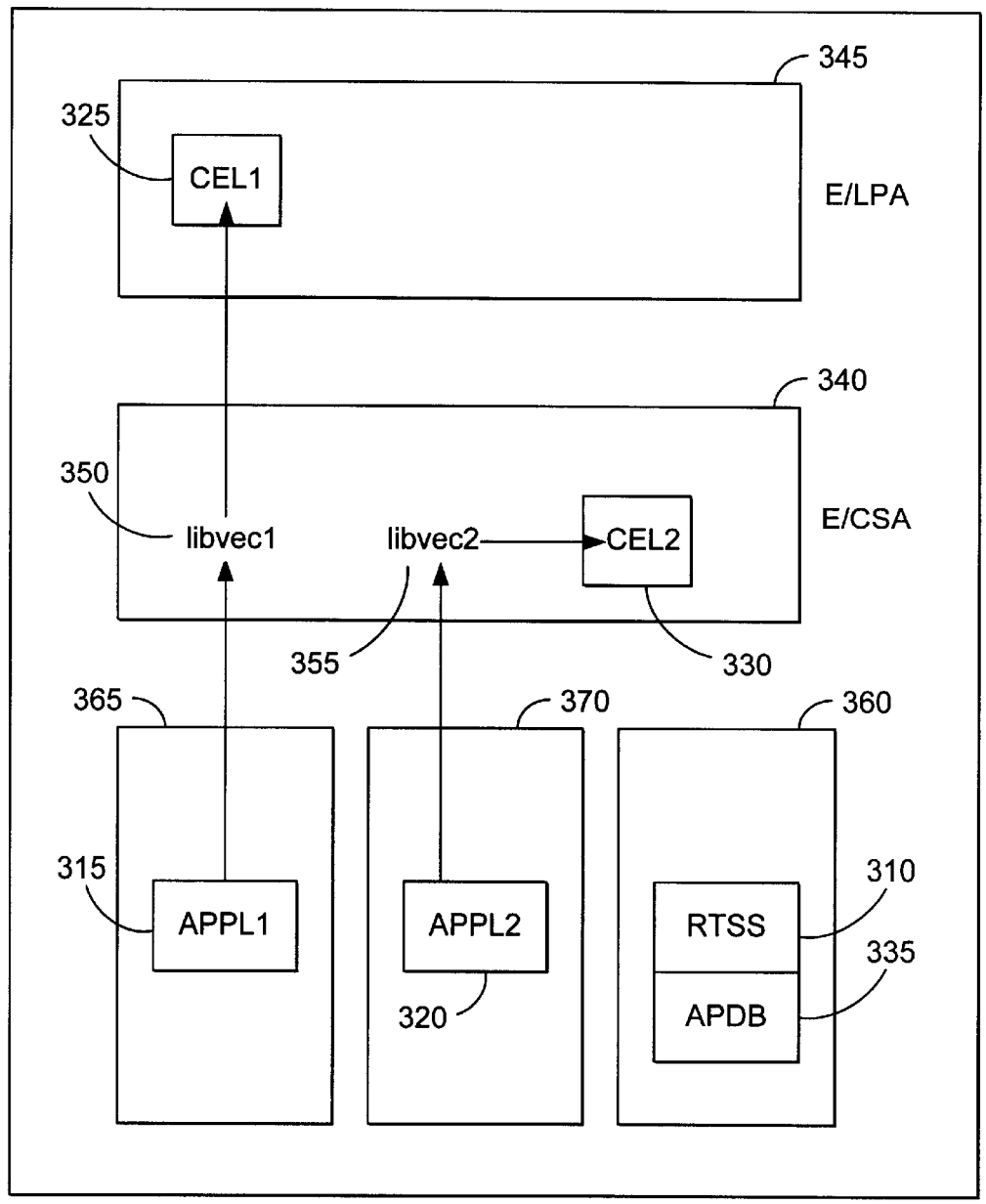
FIG. 3 shows a block diagram of a system for finding and associating an application program with its Run Time Libraries at run time in accordance with the present invention.

Referring first to FIG. 1 and FIG. 2, conventional systems for finding and associating an application program with its Run Time Libraries at run time are illustrated. These two conventional systems for finding and using Run Time Libraries are similar, except for the resultant location of the Run Time Libraries in memory. FIG. 1 represents the scenario where the application program 110 is started specifying a library from which "LE/370" is to load the Run Time Library such as Common Execution Library (CEL) 120. The CEL Run Time Library 120 is shown loaded into the private region 130 of the address space 140 where it may not be shared by other application programs running in the system, as opposed to the common region of memory 160. During application program initialization, the "LE/370" product loads the Run Time Library (CEL) 120 and builds a list of addresses (libvec) 150 to routines within the Run Time Library 120. This libvec 150 is associated with the application program 110 so that these routines can be invoked directly by the application program 110, or by language generated code.

FIG. 2 represents the alternate scenario where the Run Time Library CEL 220 is pre-installed into a common region of memory 260 where it can be seen and shared by application programs (210 and 270) running in the system through libvecs associated with these application programs, 250 and 290. In an "MVS/ESA" operating system, this common region of memory 260 is known as the Link Pack Area (LPA) or Extended Link Pack Area (ELPA), which is an area of storage which is set aside at MVS operating system initialization and which is shared among all address spaces, 230 and 280. Another example of this scenario is the "IBM APL for MVS" product which may preload an APL Run Time Library only into the MVS operating system Common Storage Area (CSA) or Extended Common Storage Area (ECSA), an area of storage in the MVS operating system which is shared among all address spaces.

The present invention embodies a new entity, called the Run Time SubSystem (or RTSS). Pictorially, the RTSS is shown in FIG. 3. The RTSS 310 effectively sits between application programs (APPL1 315 and APPL2 320) and their associated Run Time Libraries (CEL1 325 and CEL2 330) and links them dynamically when the application programs (315 and 320) are initialized. The RTSS 310 determines at the application program initialization which Run Time Libraries to link with the application program.

Prior to running any application program, the RTSS 310 is started by an operator command or script. The RTSS 310 reads an Application Profile Data Base (APDB) 335 from a file. The structure and contents of a preferred embodiment of the APDB are detailed below. The primary purposes of the RTSS 310 are to optionally pre-load any needed Run Time Libraries into common storage (CSA) 340, and to optionally find a pre-installed version in LPA storage 345. The RTSS 310 also builds any needed library vectors (libvec1 350 and libvec2 355) prior to an application program needing the libvecs. Run Time Libraries are only loaded into store protected storage, so unauthorized users can not modify them. The RTSS is able to arrange this, because it runs in its own address space 360, separate from any application program address space (365 and 370), and is authorized.

When an application program is started, a communication is made to the RTSS internally. This communication may be made through several system specific means well known to those skilled in the art. Using the subsystem interface (SSI) is one possible means of doing this on an MVS system. Others are PC-SS to the RTSS address space, or PC-nonSS to a common routine.

In response to this comunication, the RTSS links the application program to an appropriate Run Time Library version as specified in the APDB for this application program or program type, or to a default if there is no specification in the APDB for this application program program type.

The APDB contains information about Run Time Libraries and application programs, and contains the necessary information to enable the RTSS to link an application program with a specific version of a RTL. The RTSS reads the APDB to determine which Run Time Libraries linked with which application programs and where to load them. An example of a simple APDB is shown in the following Table A.

TABLE A

Example of Application Profile DataBase 1. load(CEL16,LPA) // find this version in LPA at RTSS init
2. load(CEL15,CSA) // load this version in CSA at RTSS init
3. default_library = CEL16 // use this lib whenever no choice is made
4. system_library = CEL16 // use this for system programs
5. default_load = private // if must load, do it into private, not CSA
6. application(catial) = CEL15 // special level for catia
7. application(payroll) = CEL14+ // payroll needs 1.4 or higher,
    // because uses a service new in 1.4
8. application(mapicx),load__csa = CEL17 // override default and load
    // in CSA due to high usage
    // this important application In the example of Table A, the numbers on the left of each line of the APDB are for explanation purposes only, and correspond to the following list which explains each Application Profile Data Base entry:

1. Indicates that the RTSS is to find the Run Time Library known by the name CEL16 in LPA storage when it initializes. If the Run Time Library is not found, it will be loaded into CSA storage. A library vector is also pre-built.
2. Indicates that the RTSS is to load the Run Time Library known by the name CEL15 in CSA storage when it initializes. A library vector is also pre-built.
3. Indicates to the RTSS that whenever an application program has not specified a Run Time Library level (either via the APDB or possibly through a new runtime option), this is the level of the Run Time Library to use.
4. Indicates to the RTSS that whenever a system component uses a RTL, this is the level of Run Time Library to use.
5. Indicates to the RTSS that whenever an application program uses a level of Run Time Library for which no load directive was used (such as line 1 or line 2 above directing a CSA load or LPA use), the Run Time Library is to be loaded in user private storage instead of CSA. This can be done (optionally) to conserve CSA for low use Run Time Libraries.
6. This is a line directing that a specific application program (called "catia1") be linked with a specific version of the RTL (CEL15). In the preferred embodiment, the name "catia1" may be required to be included in the application program via a compile or link option, resulting in something akin to a signature CSECT. Otherwise, it may be difficult to determine a job or transaction name at runtime, due to differences in environments (TSO, batch, CICS, IMS, . . . ).
7. This is a line directing that a specific application program (called "payroll") to be linked with version CEL14 of the Run Time Library or above. This would be common if an application program uses a service new with a particular release. In this case, the application program only requires access to that release or a later one, since upward compatibility is insured.
8. This is a line directing that a specific application program (called "mapicx") to be linked with version CEL17 of the Run Time Library, and the Run Time Library should be loaded in CSA if it is not already loaded. The effect of this directive is that CEL17 is not loaded when the RTSS pre-loads all other versions that it knows about. The reason for this is so that a common version of the APDB can be shared across all members of an organization's systems even though this application program may only reside on one of them. This Run Time Library will be loaded if ever needed, but if it is needed, such as on the particular set of machines running this application program, it is needed with frequency justifying loading it into common (CSA) storage.

The names of Run Time Libraries shown in FIG. 3 are important to the design. In the case of the load directive to LPA, the name CEL16 is being assigned to whatever version of Run Time Libraries is found in LPA by the RTSS. In all other cases, where RTSS is to load Run Time Libraries, the name is the name assigned to a DD card in the RTSS started task JCL where the DD card points to a dataset containing that level of the Run Time Libraries. While a user may name a library "FRED", the ability for the RTSS to support that version of the library and function may be compromised. In the preferred embodiment, the Run Time Libraries are given names corresponding to their release numbers.

The RTSS may be implemented without support to ever stop the RTSS, except when reinitializing the operating system. Alternatively, the RTSS may be implemented with such support to better enable dynamic library additions or changes.

Figure 4:
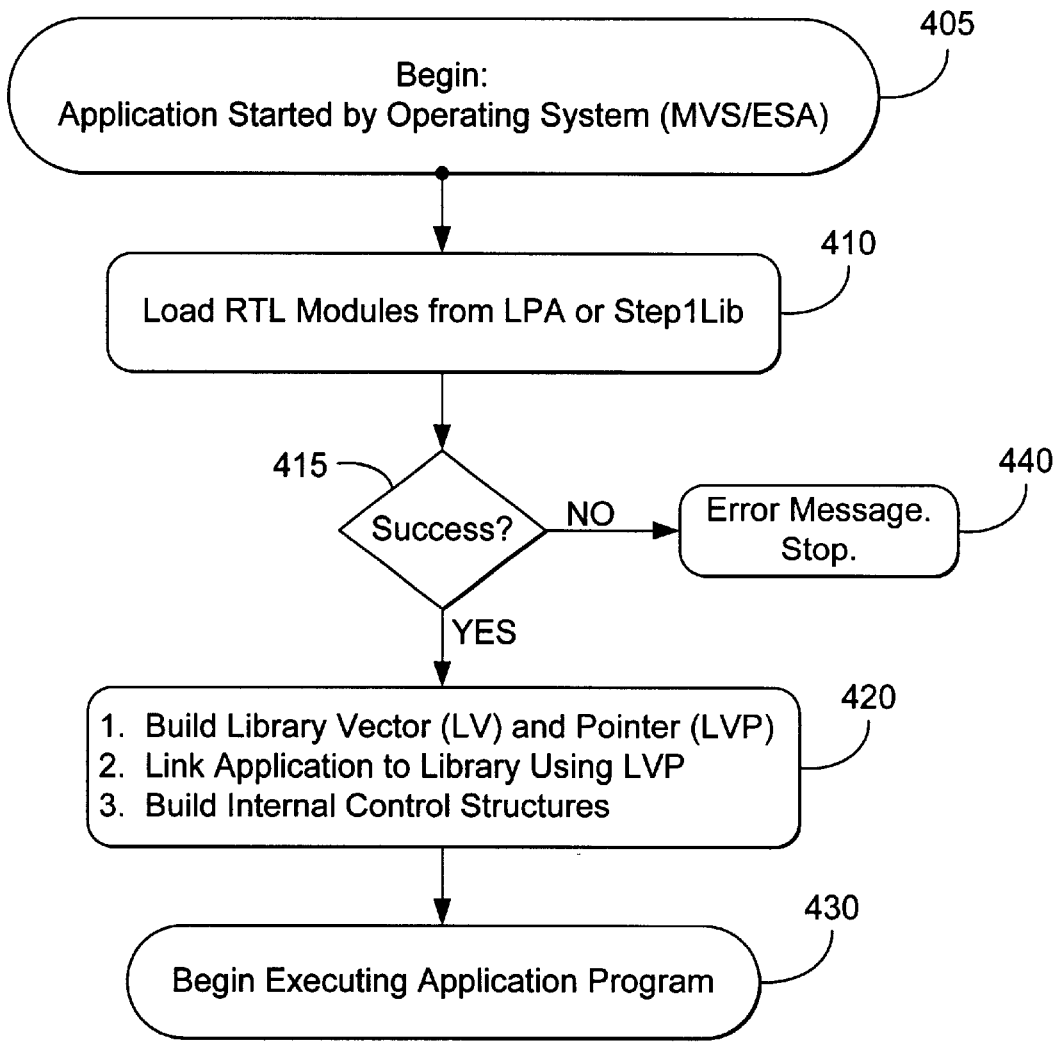
FIG. 4 is a flowchart illustrating operations representative of a conventional system for initializing an application program and for linking this application program to Run Time Libraries.

Referring now to FIG. 4, the flowchart illustrates operations representative of a conventional system for initializing an application program and for linking this application program to Run Time Libraries. The conventional system begins at process block 405 when an application program is started by the operating system, such as submitting a batch job under the "MVS/ESA" operating system ("MVS/ESA" is a trademark of the International Business Machines Corporation.). Thereafter, in process block 410 a language runtime, such as "LE/370", attempts to load the necessary language runtime modules as part of initialization for this application program. These language runtime modules are either found in LPA (MVS Link Pack Area) in memory or are loaded from disk storage via a STEPLIB JCL statement.

After process block 410, decision block 415 determines if the necessary language runtime modules were found or loaded. If the necessary language runtime modules were not found or loaded, then the conventional system causes process block 440 to produce an error message indicating the failure and the application program is stopped.

Returning now to decision block 415, if the necessary language runtime modules were found or loaded, then the conventional system causes process block 420 to build a library vector (LV) which contains information on how to invoke routines inside the language runtime modules, to store a pointer to this library vector (LVP) for later use, and to build other internal control structures for the language runtime.

Thereafter, the conventional system causes process block 430 to give control to the application program to begin executing.

Referring now to FIG. 5 through FIG. 10, flowcharts illustrating operations preferred in carrying out the present invention are shown. In the flowcharts, the graphical conventions of a diamond for a test or decision and a rectangle for a process or function are used. These conventions are well understood by those skilled in the art, and the flowchart is sufficient to enable one of ordinary skill to write code in any suitable computer programming language.

Figure 5:
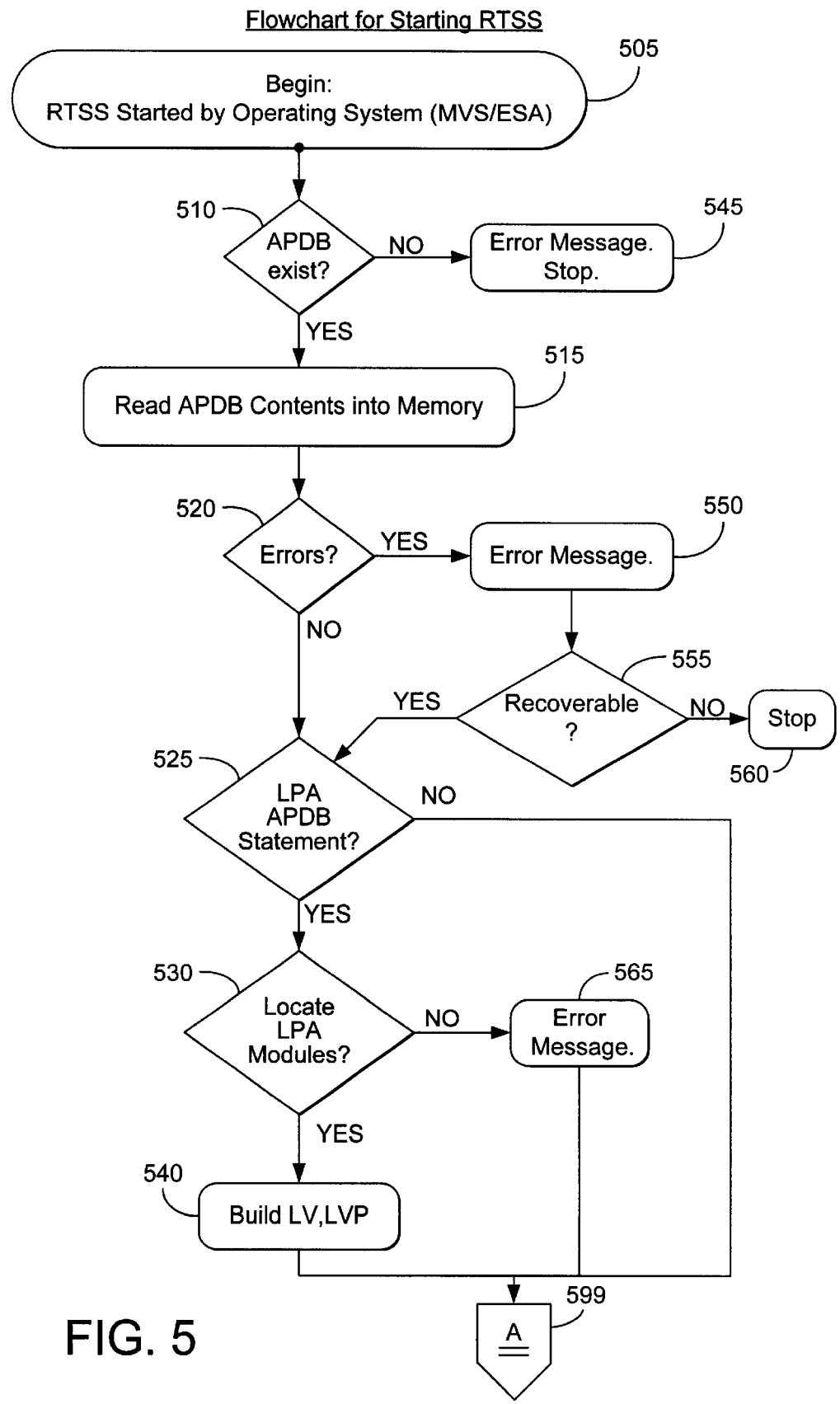
FIG. 5 through FIG. 10 are flowcharts illustrating the operations preferred in carrying out present invention.
Figure 6:
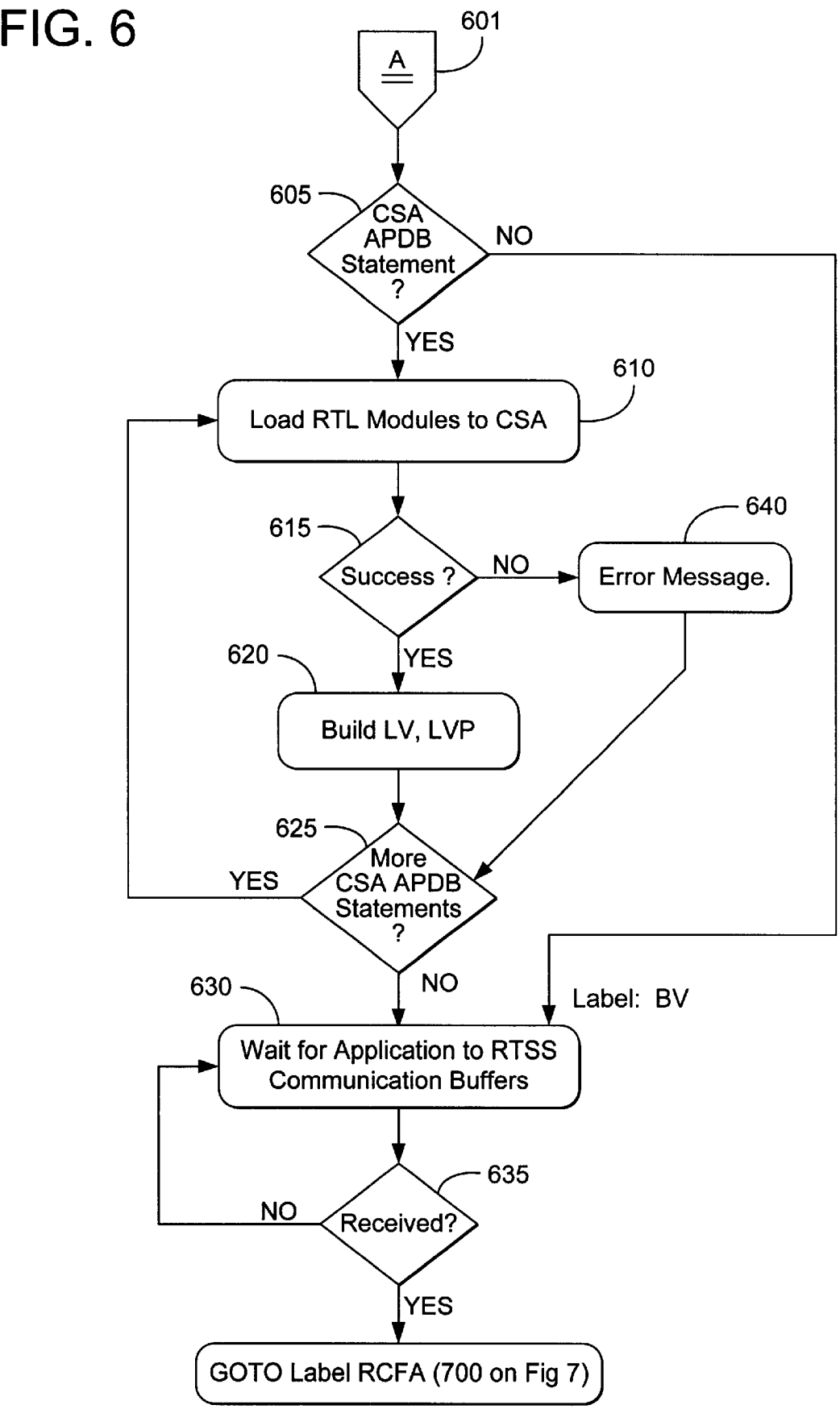
Figure 7:
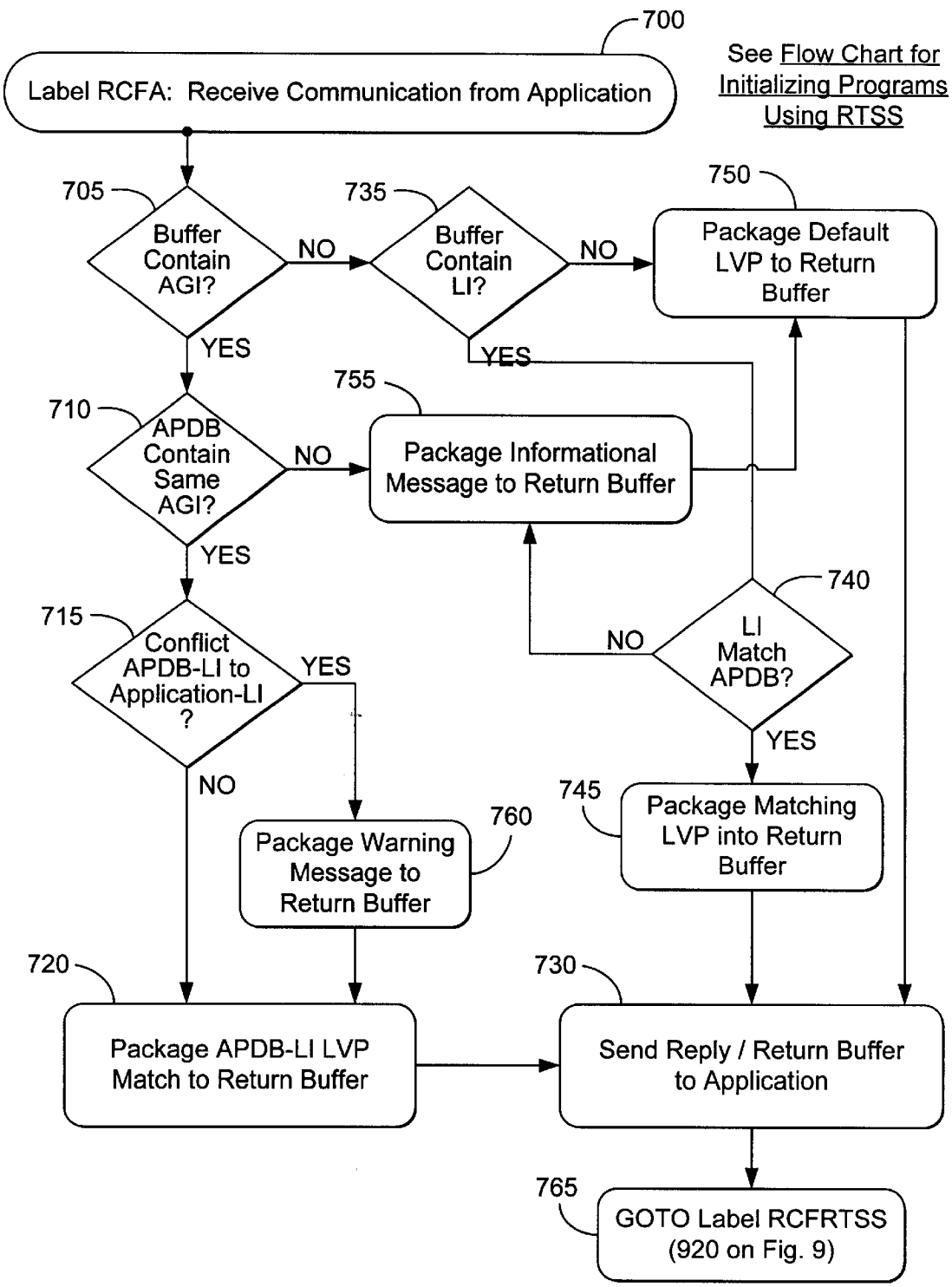
Figure 8:
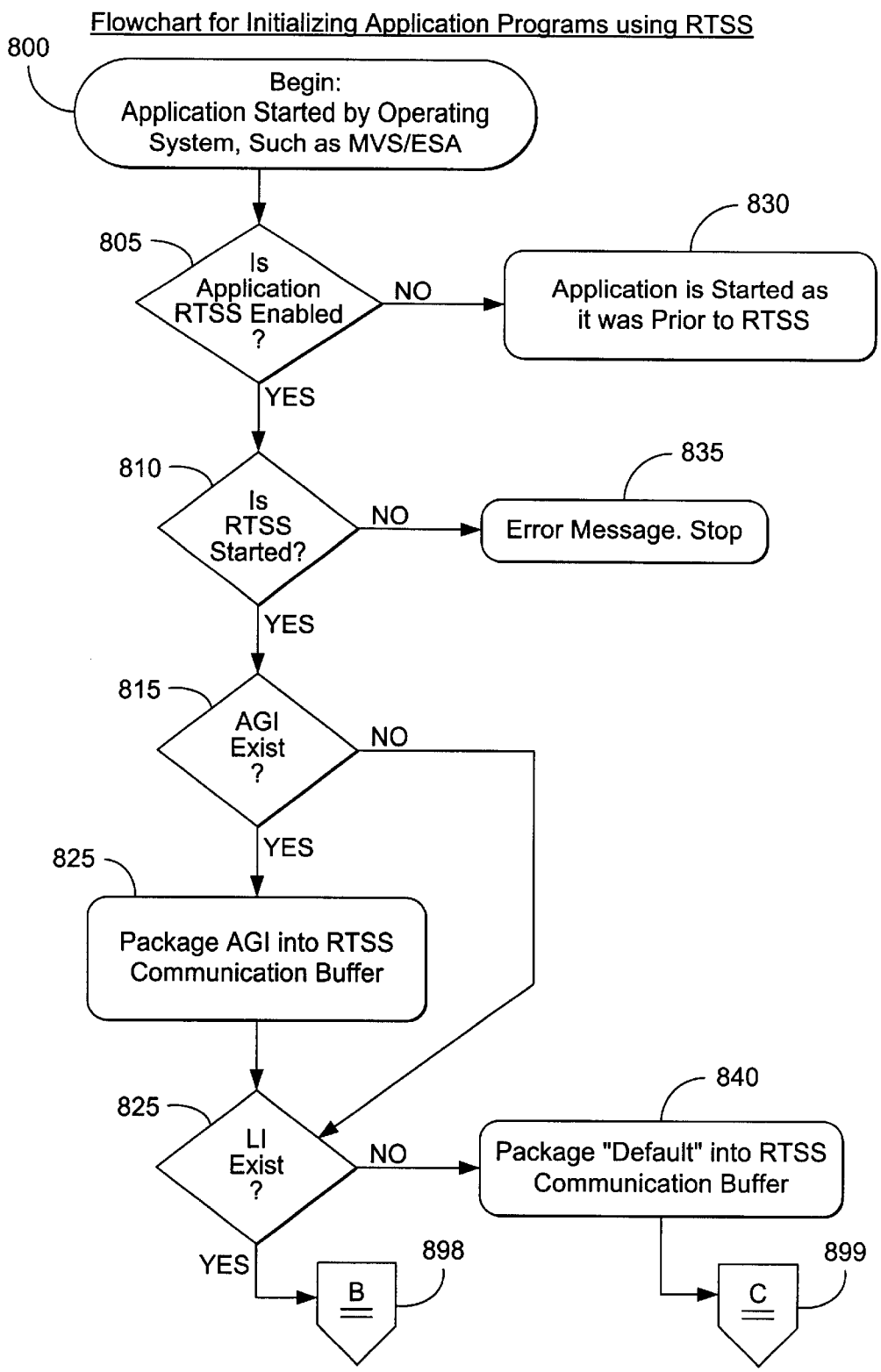
Figure 9:
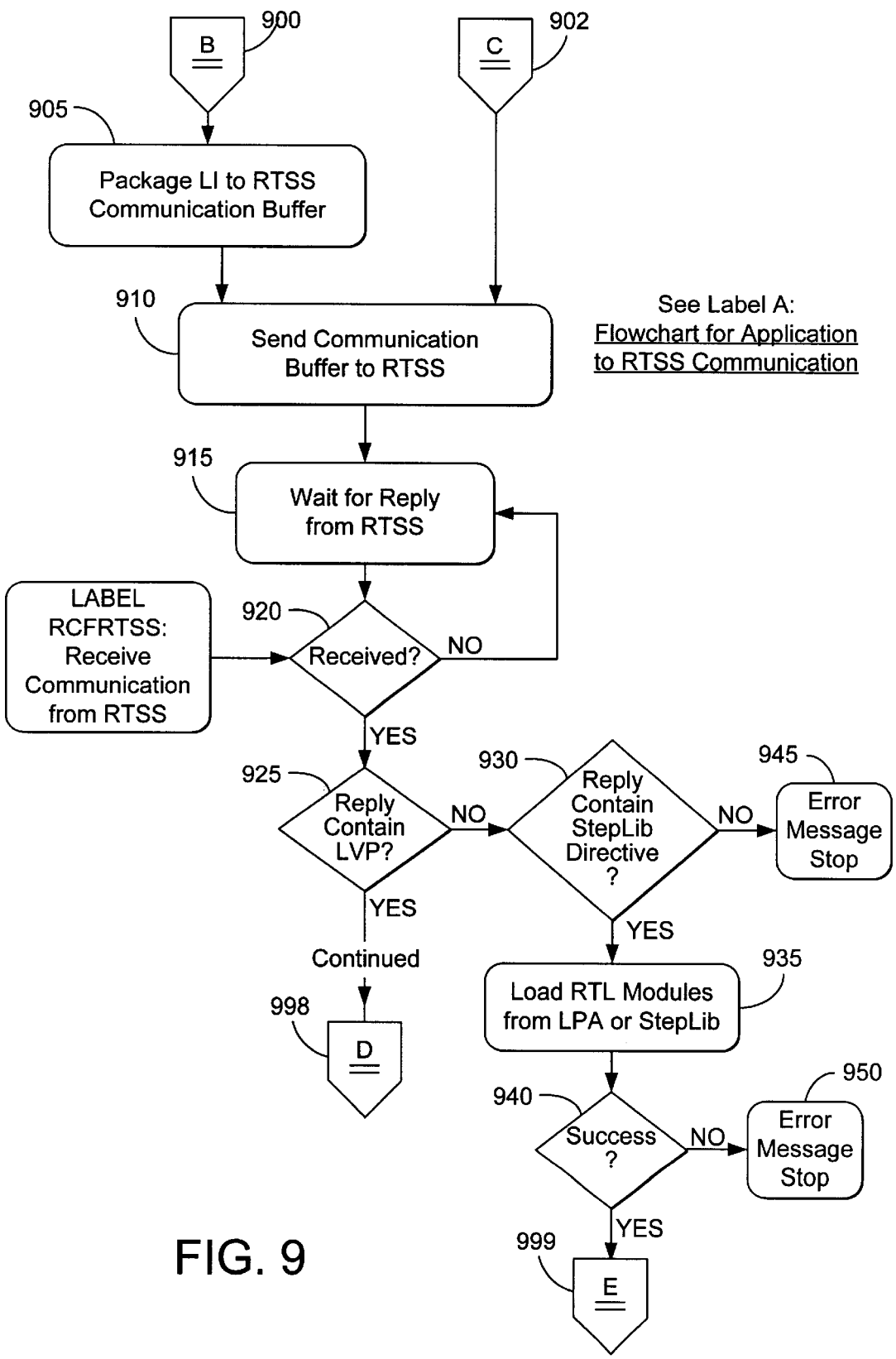
Figure 10:
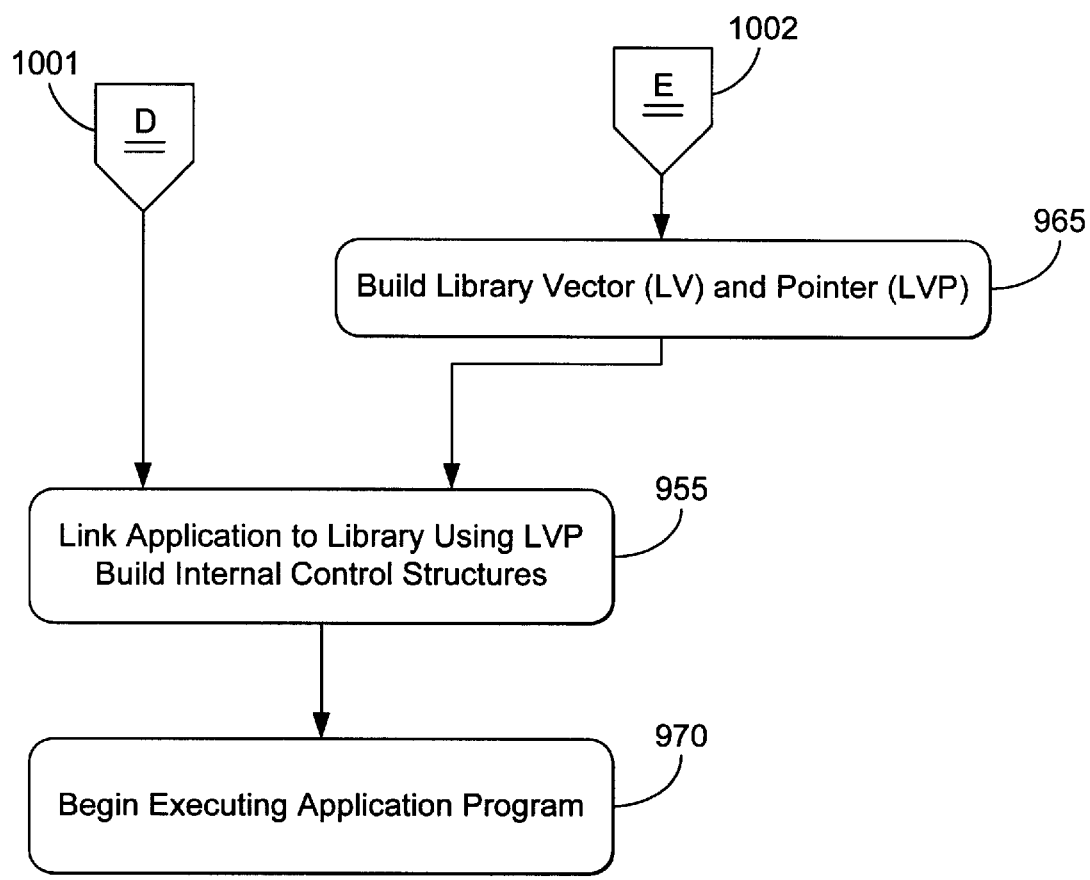

In this preferred embodiment, the present invention may be implemented as three processes:
1) a process for starting the Run Time Subsystem, illustrated in FIG. 5 and FIG. 6;
2) a process for application program to Run Time Subsystem communication, illustrated in FIG. 7; and
3) a process for initializing application programs using the Run Time Subsystem, illustrated in FIG. 8, FIG. 9, and FIG. 10.

Referring first to FIG. 5, the flowchart illustrates the operations preferred in carrying out the process for starting the Run Time Subsystem. The computer program causes process block 505 to start the Run Time Subsystem (RTSS) when the operating system starts (e.g., when the "MVS/ESA" operating system starts) so that the RTSS may be ready to provide its function to application programs as described below. Thereafter, decision block 510 determines if an Application Profile Data Base (APDB) exists. If the Application Profile Data Base does not exist, then process block 545 causes the Run Time Subsystem to issue an error message to indicate a failure and the Run Time Subsystem stops.

Returning now to decision block 510, if an Application Profile Data Base exists, then process block 515 reads the contents of the Application Profile Data Base into memory for processing. Thereafter, decision block 520 determines if any errors were encountered in the Application Profile Data Base. If an error was encountered in the Application Profile Data Base, then process block 550 issues an error message for each error found in the Application Profile Data Base. Decision block 555 then determines if any error found in the Application Profile Data Base is a fatal error. If an error found in the Application Profile Data Base is a fatal error, then process block 560 stops the Run Time Subsystem when such a fatal error is encountered. If no errors found in the Application Profile Data Base are a fatal error, then processing continues from decision block 555 to decision block 525.

Returning now to decision block 520, if no errors were encountered in the Application Profile Data Base, then decision block 525 determines if an LPA statement exists in the Application Profile Data Base. An LPA statement indicates that a version of the language modules will be found in the LPA area of storage. The LPA statement will also cause a version of modules found in the LPA to be known by a specific name. If an LPA statement exists in the Application Profile Data Base, then decision block 530 determines if the version of LPA language modules can be located. If the version of LPA language modules can be located, then process block 540 builds a Library Vector (LV) and Library Vector Pointer (LVP) corresponding to the version of language modules located in the LPA area of storage. Thereafter, processing continues to decision block 605 on FIG. 6. This processing path is illustrated by flowchart connectors A, 599 on FIG. 5 and 601 on FIG. 6.

Returning now to decision block 530, if the version of LPA language modules can not be located, then process block 565 issues an error message indicating a failure in locating LPA language modules. Thereafter, processing continues to decision block 605 on FIG. 6. This processing path is illustrated by flowchart connectors A, 599 on FIG. 5 and 601 on FIG. 6.

Returning now to decision block 525, if an LPA statement does not exist in the Application Profile Data Base, then processing continues to decision block 605 on FIG. 6. This processing path is illustrated by flowchart connectors A, 599 on FIG. 5 and 601 on FIG. 6.

Referring now to FIG. 6, after control passes from decision block 525, process block 540, or process block 565, as indicated by flowchart connectors A, 599 on FIG. 5 and 601 on FIG. 6, then decision block 605 determines if a CSA statement exists in the Application Profile Data Base. The CSA statement indicates that a version of the language modules will be loaded in the CSA area of storage. This CSA statement will also cause the version of language runtime modules listed to be loaded and known by the specified name. If a CSA statement exists in the Application Profile Data Base, then process block 610 causes the version of language runtime modules listed to be loaded in the CSA area of storage and to be known by the specified name. Thereafter, decision block 615 determines if the loading of the version of language runtime modules was successful. If the loading of the version of language runtime modules was successful, then process block 620 builds a Library Vector (LV) and Library Vector Pointer (LVP) corresponding to the version of language modules loaded in the CSA area of storage. Thereafter, decision block 625 determines if there is another CSA statement in the Application Profile Data Base. If there are not any more CSA statements in the Application Profile Data Base, then the Run Time Subsystem is initialized, and process block 630 awaits communication buffers, which will be received from application programs when they begin executing. These communication buffers will contain requests that the Run Time Subsystem provide information on the whereabouts of specific versions of the language runtime modules. Thereafter, decision block 635 tests for the receipt of the communication buffers containing a request from an application program. If communication buffers containing a request from an application program have been received, then control passes to process block 700 on FIG. 7, the beginning of the process for application program to Run Time Subsystem Communication.

Returning now to decision block 635, if communication buffers containing a request from an application program have not been received, then processing loops back to process block 630 to await communication buffers.

Returning now to decision block 625, if there is another CSA statement in the Application Profile Data Base, then processing loops back to process block 610 to process this CSA statement.

Returning now to decision block 615, if the loading of the version of language runtime modules was not successful, then process block 640 issues an error message indicating a failure in loading language modules. Thereafter, processing continues to decision block 625 to determine if there is another CSA statement in the Application Profile Data Base.

Returning now to decision block 605, if a CSA statement does not exist in the Application Profile Data Base, then processing continues to process block 630 to await communication buffers.

Referring now to FIG. 7, the flowchart illustrates the operations preferred in carrying out the process for application program to Run Time Subsystem communication. The process starts at process block 700 when communication buffers containing a request from an application program have been received and this process is started by decision block 635 of FIG. 6. Thereafter, decision block 705 determines if the communication buffer from the application program contains an Application Group Identifier (AGI). This Application Group Identifier may be used to associate this application program with a version of the language runtime modules via information from the Application Profile Data Base. If the communication buffer from the application program contains an Application Group Identifier, then decision block 710 determines if the Application Group Identifier is specified in the Application Profile Data Base. If the Application Group Identifier is specified in the Application Profile Data Base, then decision block 715 determines if a conflict exists between the Library Identifier (LI) specified by the Application Profile Data Base (as indicated by the matching Application Group Identifier) and the Library Identifier specified by the application program. If no conflict exists between the two Library Identifiers, then process block 720 packages into the return buffer the LVP matching the Library Identifier specified in the Application Profile Data Base. Thereafter, process block 730 sends the return buffer back to the application program address space, where the return buffer will be processed by language runtime modules. Thereafter, the process stops at process block 765. If no errors result from this processing of the return buffer by the language runtime modules, then the language runtime modules will complete initialization allowing application program to begin executing using the correct version of the language runtime modules.

Returning now to decision block 715, if a conflict does exist between the Library Identifier specified by the Application Profile Data Base and the Library Identifier specified by the application program, then process block 760 places a warning message indicating the conflict into the return buffer. Processing then continues to process block 720 for packaging of the LVP into the return buffer.

Returning now to decision block 710, if the Application Group Identifier is not specified in the Application Profile Data Base, then process block 755 packages an informational message into the return buffer which will be sent back to the application program indicating that the Application Group Identifier was not in the Application Profile Data Base, but that the application program requested it. Thereafter, process block 750 packages the default LVP into the return buffer as the information contained in the communication buffer from the application program indicates that the Run Time Subsystem should use the default version of the library runtime modules (as specified in the APDB). This is represented back to the application program address space by sending the default LVP in the return buffer. Thereafter, processing continues to process block 730 which sends the return buffer back to the application program address space, where the return buffer will be processed by language runtime modules.

Returning now to decision block 705, if the communication buffer from the application program does not contain an Application Group Identifier, then decision block 735 determines if the communication buffer from application program contains a Library Identifier. This Library Identifier may be used to match this application program with the version of the language runtime modules that it represents. If the communication buffer from application program contains a Library Identifier, then decision block 740 determines if there is a Library Identifier in the Application Profile Data Base matching this Library Identifier from the communication buffer. If there is a Library Identifier in the Application Profile Data Base matching this Library Identifier, then process block 745 packages the LVP matching the specified Library Identifier into the return buffer. Thereafter, processing continues to process block 730 which sends the return buffer back to the application program address space, where the return buffer will be processed by language runtime modules.

Returning now to decision block 740, if there is no Library Identifier in the Application Profile Data Base matching this Library Identifier from the communication buffer, then processing continues to process block 755 which packages an informational message into the return buffer which will be sent back to the application program indicating that the Library Identifier did not match a Library Identifier in the Application Profile Data Base.

Returning now to decision block 735, if the communication buffer from application program does not contain a Library Identifier, then processing continues to process block 750 which packages the default LVP into the return buffer.

Referring now to FIG. 8, the flowchart illustrates the operations preferred in carrying out the process for initializing application programs using the Run Time Subsystem. The process starts at process block 800 when an application program has been started (e.g., by submitting a batch job under the "MVS/ESA" operating system). Thereafter, decision block 805 determines if the Run Time Subsystem is enabled (by internally checking for the presence of a special signature CSECT). If the Run Time Subsystem is enabled, then decision block 810 determines if the Run Time Subsystem has been started successfully (as detailed in FIG. 5 and FIG. 6). If the Run Time Subsystem has been started successfully, then decision block 815 determines if an Application Group Identifier exists. If an Application Group Identifier exists, then process block 820 puts the Application Group Identifier into the buffer that will be sent to the Run Time Subsystem for processing. Thereafter, decision block 825 determines if a Library Identifier exists. If a Library Identifier exists, then processing continues to process block 905 on FIG. 9. This processing path is illustrated by flowchart connectors B, 898 on FIG. 8 and 901 on FIG. 9.

Returning now to decision block 825, if a Library Identifier does not exist, then process block 840 packages in the buffer that will be sent to the Run Time Subsystem an indication that the application program should use the default Library Identifier. This indicates that the application program has no specific language runtime library requirement, rather that is should be given whatever the installation has indicated via the Application Profile Data Base is the default level. Thereafter, processing continues to process block 910 on FIG. 9. This processing path is illustrated by flowchart connectors C, 899 on FIG. 8 and 902 on FIG. 9.

Returning now to decision block 815, if an Application Group Identifier does not exist, then processing continues to decision block 825 to test whether a Library Identifier exists.

Returning now to decision block 810, if the Run Time Subsystem has not been started successfully, then process block 835 issues an error message that the Run Time Subsystem is not available and terminates the application program. In an alternative embodiment, process block 835 may proceed with application program initialization without Run Time Subsystem involvement as illustrated in FIG. 4.

Returning now to decision block 805, if the Run Time Subsystem is not enabled, then process block 830 starts the application program without Run Time Subsystem involvement as illustrated in FIG. 4.

Referring now to FIG. 9, after control passes from decision block 825 as indicated by flowchart connectors B, 898 on FIG. 8 and 901 on FIG. 9, then process block 905 puts the Library Identifier into the buffer that will be sent to the Run Time Subsystem for processing. Thereafter, process block 910 sends the communication buffer to the Run Time Subsystem for processing. This may be accomplished using the Subsystem Interface (SSI) in the "MVS/ESA" operating system, or by other operating system specific interprocess communication mechanisms well known to those skilled in the art. Thereafter, process block 915 waits for a reply from the Run Time Subsystem process. Thereafter, decision block 920 tests for the receipt of the reply from the Run Time Subsystem. This may be an actual test, or the application program initialization logic may be awakened using standard operating system interprocess communication techniques well known to those skilled in the art. If the reply has not been received, then processing loops back to process block 915 to wait for a reply from the Run Time Subsystem process.

Returning now to decision block 920, if the reply has been received, then decision block 925 determines if the reply contains a Library Vector Pointer (LVP) which is the linkage mechanism to the language runtime modules. If the reply contains a Library Vector Pointer, then processing continues to process block 955 on FIG. 10. This processing path is illustrated by flowchart connectors D, 998 on FIG. 9 and 1001 on FIG. 10.

Returning now to decision block 925, if the reply does not contain a Library Vector Pointer, then decision block 930 determines if the reply indicates that application program initialization should use JCL STEPLIB in lieu of an LVP. If the reply does not indicate that application program initialization should use JCL STEPLIB in lieu of an LVP, then process block 945 issues an error message indicating that a severe error has occurred and stops the initialization of the application program.

Returning now to decision block 930, if the reply indicates that application program initialization should use JCL STEPLIB in lieu of an LVP, then process block 935 loads the language runtime modules from LPA or from steplib as illustrated in FIG. 4. Thereafter, decision block 940 tests for successfully loaded language runtime modules. If the language runtime modules did not successfully load, then process block 950 issues an error message and stops initialization of the application program.

Returning now to decision block 940, if the language runtime modules successfully loaded, then processing continues to process block 965 on FIG. 10. This processing path is illustrated by flowchart connectors E, 999 on FIG. 9 and 1002 on FIG. 10.

Referring now to FIG. 10, after control passes from decision block 925 as indicated by flowchart connectors D, 998 on FIG. 9 and 1001 on FIG. 10, then process block 955 uses the LVP returned from the Run Time Subsystem to link the application program with the language runtime modules needed. The LVP is used to find these modules in storage. The remainder of the language initialization can proceed using these modules now that they have been successfully found. Thereafter, process block 970 gives control to the application program to execute as the language environment has been initialized.

Returning now to process block 965, to which control is passed from decision block 940 as illustrated by flowchart conneters E, 999 on FIG. 9 and 1002 on FIG. 10, process block 965 builds the Library Vector (LV) and its pointer (LVP) as illustrated in FIG. 4, as the Run Time Subsystem has indicated that this is the approach to use instead of being given an LVP for preloaded language runtime modules. Thereafter, processing continues to process block 955 to link the application program with the language runtime modules needed.

Although the above preferred embodiment is implemented in an MVS operating system environment, those skilled in the art will recognize that the present invention may be applied to other operating system environments.

Figure 11:
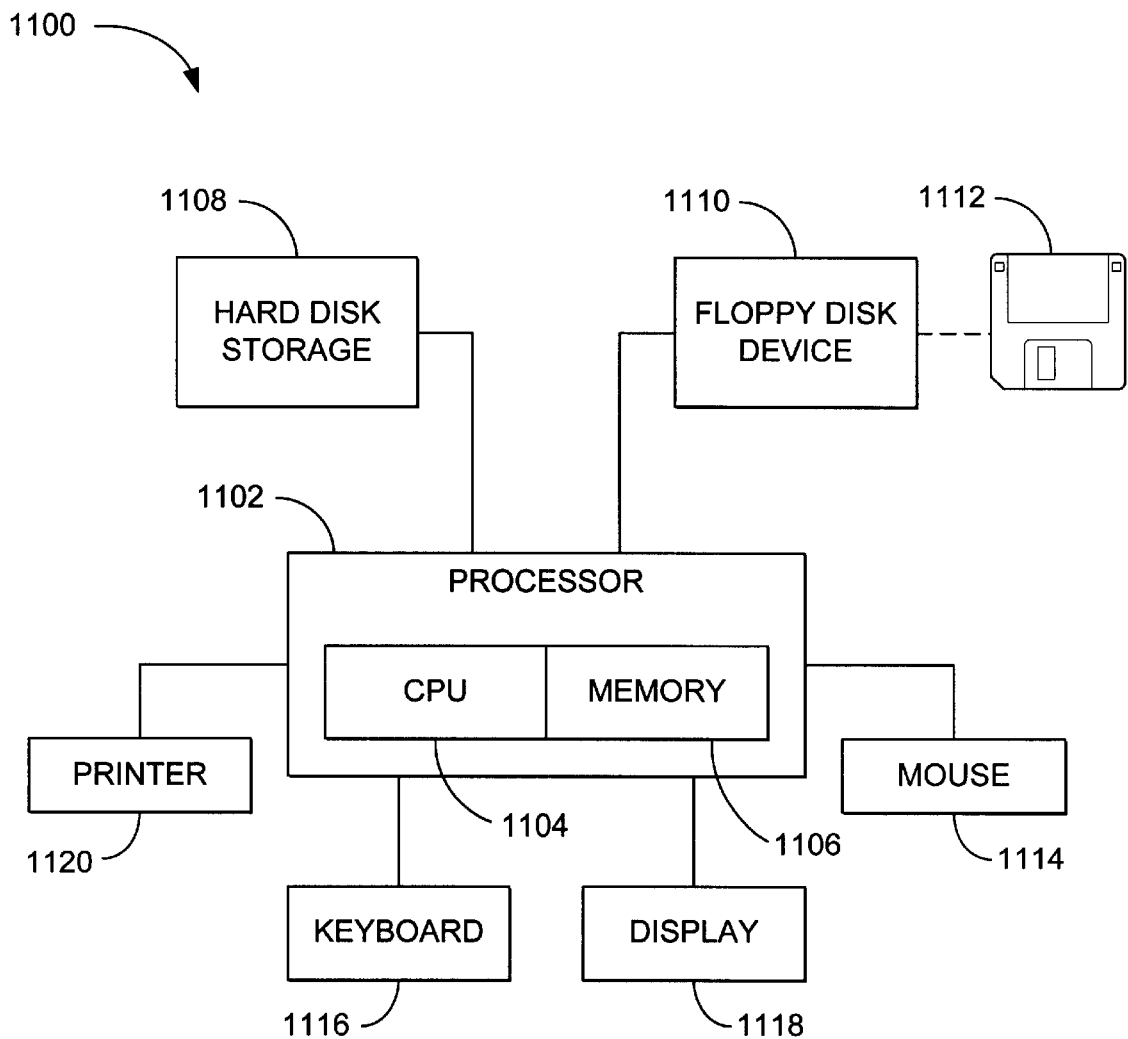
FIG. 11 is a block diagram of a computer system used in performing the method of the present invention, forming part of the apparatus of the present invention, and which may use the article of manufacture comprising a computer-readable storage medium having a computer program embodied in said medium which may cause the computer system to practice the present invention.

Referring now to FIG. 11, a block diagram illustrates a computer system 1100 used in performing the method of the present invention, forming part of the apparatus of the present invention, and which may use the article of manufacture comprising a computer-readable storage medium having a computer program embodied in said medium which may cause the computer system to practice the present invention. The computer system 1100 includes a processor 1102, which includes a central processing unit (CPU) 1104, and a memory 1106. Additional memory, in the form of a hard disk file storage 1108 and a computer-readable storage device 1110, is connected to the processor 1102. Computer-readable storage device 1110 receives a computer-readable storage medium 1112 having a computer program embodied in said medium which may cause the computer system to implement the present invention in the computer system 1100. The computer system 1100 may also include user interface hardware, including a mouse 1114 and a keyboard 1116 for allowing user input to the processor 1102 and a display 1118 for presenting visual data to the user. The computer system may also include a printer 1120.

Although the present invention has been particularly shown and described with reference to a preferred embodiment, it will be understood by those skilled in the art that various changes in form and detail may be made without departing from the spirit and the scope of the invention.

We claim:

1. A computer-implemented system for dynamically linking an application program to a run time library, comprising:

(a) a central repository for storing information regarding usage of run time libraries in a computer, wherein the information identifies which run time libraries are linked to which application programs and where to load the run time libraries;

(b) a run time subsystem, executed by the computer separately from any application program, for using the run time libraries in accordance with the information stored in the central repository, wherein the run time subsystem determines at the application program's initialization which of the run time libraries to link with the application program and then links the application program and the run time libraries.

2. The computer system of claim 1, wherein the central repository comprises an application profile data base containing information regarding usage of the run time libraries.

3. The computer system of claim 1, wherein the run time subsystem is started prior to running any application program.

4. The computer system of claim 1, wherein the run time subsystem optionally pre-loads any needed run time libraries into common storage.

5. The computer system of claim 1, wherein the run time subsystem optionally finds a pre-installed version of the run time libraries in a storage area.

6. The computer system of claim 1, wherein the run time subsystem loads the run time libraries into protected storage, so unauthorized users can not modify them.

7. The computer system of claim 1, wherein the run time subsystem starts the run time subsystem for dynamically lining the application program to the run time library prior to initialization of the application program.

8. The computer system of claim 1, wherein the central repository contains information associating the application program and the run time library if the application program and the run time library are associated, information specifying where in memory the run time subsystem is to load the run time library, and information specifying a default run time library if the application program and the run time library are not associated.

9. The computer system of claim 1, wherein the run time subsystem loads the run time library into a region of the storage specified in the central repository.

10. The computer system of claim 1, wherein the run time subsystem searches in a first region of storage for the run time library, and loads the run time library into a second region of storage specified in the central repository, if the run time library is not found.

11. The computer system of claim 1, wherein the run time subsystem loads a default run time library in response to the request, if no run time library is associated with the application program in the central repository.

12. The computer system of claim 1, wherein the run time subsystem determines if the application program is of a specified type, and links the application program with a specific version of the run time library associated with the specified type in the central repository.

13. The computer system of claim 1, wherein the run time subsystem determines if the run time library has not been loaded into a first region of storage, and loads the run time library into a second region of storage.

14. The computer system of claim 1, wherein the run time subsystem links the application program with a specific version of the run time library associated with the application program in the central repository.

15. The computer system of claim 1, wherein the run time subsystem links the application program with a specified version of the run time library associated with the application program in the central repository.

16. The computer system of claim 1, wherein the run time subsystem determines if a specific version of the run time library associated with application program in the central repository is already loaded into storage, and links the application program with the specific version of the run time library.

17. A computer-implemented method for dynamically linking an application program to a run time library, comprising:
(a) storing information regarding usage of run time libraries in a central repository of a computer, wherein the information identifies which run time libraries are linked to which application programs and where to load the run time libraries; and
(b) executing a run time subsystem in an address space in the computer separate from any application program's address space, wherein the run time subsystem uses the run time libraries in accordance with the information stored in the central repository by determining at the application program's initialization which of the run time libraries to link with the application program and then linking the application program and the run time libraries.

18. The method of claim 17, wherein the central repository comprises an application profile data base containing information regarding usage of the run time libraries.

19. The method of claim 17, wherein the run time subsystem is started prior to running any application program.

20. The method of claim 17, wherein the run time subsystem optionally pre-loads any needed run time libraries into common storage.

21. The method of claim 17, wherein the run time subsystem optionally finds a pre-installed version of the run time libraries in a storage area.

22. The method of claim 17, wherein the run time subsystem loads the run time libraries into protected storage, so unauthorized users can not modify them.

23. The method of claim 17, wherein the run time subsystem starts the run time subsystem for dynamically linking the application program to the run time library prior to initialization of the application program.

24. The method of claim 17, wherein the central repository contains information associating the application program and the run time library if the application program and the run time library are associated, information specify where in memory the run time subsystem is to load the run time library, and information specifying a default run time library if the application program and the run time library are not associated.

25. The method of claim 17, wherein the run time subsystem loads the run time library into a region of the storage specified in the central repository.

26. The method of claim 17, wherein the run time subsystem searches in a first region of storage for the run time library, and loads the run time library into a second region of storage specified in the central repository, if the run time library is not found.

27. The method of claim 17, wherein the run time subsystem loads a default run time library in response to the request, if no run time library is associated with the application program in the central repository.

28. The method of claim 17, wherein the run time subsystem determines if the application program is of a specified type, and links the application program with a specific version of the run time library associated with the specified type in the central repository.

29. The method of claim 17, wherein the run time subsystem determines if the run time library has not been loaded into a first region of storage, and loads the run time library into a second region of storage.

30. The method of claim 17, wherein the run time subsystem links the application program with a specific version of the run time library associated with application program in the central repository.

31. The method of claim 17, wherein the run time subsystem links the application program with a specified version of the run time library associated with application program in the central repository.

32. The method of claim 17, wherein the run time subsystem determines if a specific version of the run time library associated with application program in the central repository is already loaded into storage, loads the specific version in a common region of storage if it is not already loaded into storage, and links the application program with the specific version of the run time library.

33. An article of manufacture for use in a computer for dynamically linking an application program to a run time library, the article of manufacture comprising a computer-readable storage medium having a computer program embodied therein which may cause the computer to:
(a) store information regarding usage of run time libraries in a central repository of a computer, wherein the information identifies which run time libraries are linked to which application programs and where to load the run time libraries; and
(b) execute a run time subsystem in an address space in the computer separate from any application program's address space, wherein the run time subsystem uses the run time libraries in accordance with the information stored in the central repository by determining at the application program's initialization which of the run time libraries to link with the application program and then linking the application program and the run time libraries.

34. An article of manufacture for use in a computer for dynamically linking an application program to a run time library, the article of manufacture comprising a computer-readable storage medium having a computer program embodied therein which may cause the computer to:
(a) store information regarding usage of run time libraries in a central repository of a computer; and
(b) execute a run time subsystem in an address space in the computer separate from any application program's address space, wherein the run time subsystem uses the run time libraries in accordance with the information stored in the central repository by determining at the application program's initialization which run time libraries to link with the application program and then linking the application program and the run time libraries.

35. The article of claim 33, wherein the central repository comprises an application profile data base containing information regarding usage of the run time libraries.

36. The article of claim 33, wherein the run time subsystem is started prior to running any application program.

37. The article of claim 33, wherein the run time subsystem optionally pre-loads any needed run time libraries into common storage.

38. The article of claim 33, wherein the run time subsystem optionally finds a pre-installed version of the run time libraries in a storage area.

39. The article of claim 33, wherein the run time subsystem loads the run time libraries into protected storage, so unauthorized users can not modify them.

40. The article of claim 33, wherein the run time subsystem starts the run time subsystem for dynamically linking the application program to the run time library prior to initialization of the application program.

41. The article of claim 33, wherein the central repository contains information associating the application program and the run time library if the application program and the run time library are associated, information specifying where in memory the run time subsystem is to load the run time library, and information specifying a default run time library if the application program and the run time library are not associated.

42. The article of claim 33, wherein the run time subsystem loads the run time library into a region of the storage specified in the central repository.

43. The article of claim 33, wherein the run time subsystem searches in a first region of storage for the run time library, and loads the run time library into a second region of storage specified in the central repository, if the run time library is not found.

44. The article of claim 33, wherein the run time subsystem loads a default run time library in response to the request, if no run time library is associated with the application program in the central repository.

45. The article of claim 33, wherein the run time subsystem determines if the application program is of a specified type, and links the application program with a specific version of the run time library associated with the specified type in the central repository.

46. The article of claim 33, wherein the run time subsystem determines if the run time library has not been loaded into a first region of storage, and loads the run time library into a second region of storage.

47. The article of claim 33, wherein the run time subsystem links the application program with a specific version of the run time library associated with application program in the central repository.

48. The article of claim 33, wherein the run time subsystem links the application program with a specified version of the run time library associated with application program in the central repository.

49. The article of claim 33, wherein the run time subsystem determines if a specific version of the run time library associated with application program in the central repository is already loaded into storage, loads the specific version in a common region of storage if it is not already loaded into storage, and links the application program with the specific version of the run time library.

* * * * *

UNITED STATES PATENT AND TRADEMARK OFFICE
CERTIFICATE OF CORRECTION

PATENT NO.     : 6,332,168 B1
DATED          : December 18, 2001
INVENTOR(S)    : Daniel E. House, Robert M. Smith and Michael T. Wheatley It is certified that error appears in the above-identified patent and that said Letters Patent is hereby corrected as shown below:

Column 14,
Lines 38-53, delete claim 34

Signed and Sealed this

Thirteenth Day of April, 2004

JON W. DUDAS
*Acting Director of the United States Patent and Trademark Office*